Patented Aug. 10, 1954

2,686,144

UNITED STATES PATENT OFFICE 2,686,144

PROCESS FOR PREPARING HELICIDINE

Fidel Gonzalez-Barcena y Fonsdeviela,
Madrid, Spain

No Drawing. Application January 30, 1950,
Serial No. 141,348

Claims priority, application Spain
February 2, 1949

7 Claims. (Cl. 167—65)

The present invention relates to a process for the production of helicidine, an antibiotic for the group of the haemophilus, selective for the "Haemophilus pertussis."

As a cure for the whooping cough or pertussis, a disease which may last for a period of several months, and which according to statistics, produces more deaths than all the other infantile diseases put together, use has been made, though without attaining what may be termed a definite result, of an endless number of treatments, whereas up to date it has been impossible to find a means that could be qualified a specific for this disease.

The labour applied to the search for an element capable of exercising an antibiotic action upon the "haemophilus" group, especially selective on the "Haemophilus pertussis," has led to the result of isolating an active principle, denominated helicidine, which when utilized in millesimal quantities showed in all experiments carried out in vitro, a total and complete inhibitory action, and in those effected in vivo, a totally specific therapeutic action.

This result is achieved by setting out especially from the secretions of the helicides and of the matters or organisms dragged along and fixed by same.

By way of an illustrative example, hereinafter one means of carrying out this process, which comprises several phases, is described.

A. So as to obtain the raw material, in the first instance, the secretory activity of the cited molluscas is excited, to which effect divers processes may be applied, i. e. mechanical, physical and/or chemical. Among the first should be mentioned, the tapping of the animal body, preferably with a glass rod. Among the physical, reference is made to a slight elevation of temperature, and among the chemical, the effect of placing them in contact with salt solutions, such as sodium chloride, or of weak acids, such as acetic or citric acids. Many other chemical products may be utilized to this effect, provided they do not affect the life of the animal and merely excite its irritability.

The indicated molluscas are left during 30 minutes to one hour in porcelain or glass capsules so as to collect therein the distillation of their secretions. Hereafter the molluscas are separated and, whilst the divers secretions are put together, the second treatment, is initiated.

B. By means of a wooden or glass spatula or in a beater, these secretions are then stirred until the mass acquires a creamy consistency, whereupon the pH is measured, and which should always be neutral.

In accordance with the origin of these molluscas, as also their diet, this cream will be of different colors, and of which green will represent those that were recently fed.

Said secretions may also be submitted to a treatment with a 10% ether, or with chloroform, or with a mixture of both, or with any other abiotic which will not alter these secretions, and thereafter proceed with the beating.

This cream is immediately spread out on glass plates to dry. The drying process may be carried out at an ambient temperature, which will require from 8 to 10 hours, or else inside a stove with a temperature of 60° C. or more, this requiring from 2 to 3 hours.

The glass plates will thus be covered with a light yellowish powder, constituted by two separate layers, the first formed by very small and light scales which will blow off at the slightest current of air, and a second layer which is more compact and adheres to the glass plate. By means of a spatula or any other process, this powder is scraped off and thereafter ground to a fine powder and sieved, until an almost impalpable powder is obtained. This powder may be immediately submitted to further treatment, whereas on the contrary, it would have to be kept in hermetically sealed topaz colored, or black bottles so as to avoid the action of the light and of moisture, to which the obtained product is very sensitive.

C. After having collected this powder, the third phase is initiated: The product is now dissolved in physiological serum in the proportion of 1 to 10%, to which penicillin is added in the proportion of 200 to 400 units per cc. After this it is left for 60 to 75 hours, at a temperature between 0° and 10° C. in hermetically sealed recipients.

From this moment onward all manipulations will have to be carried out with an absolute asepsia and, therefore, it will be necessary to work with apparatus, elements, staff, etc. which have previously been scrupulously sterilized.

D. The said liquid is now filtered, through paper or by any other known process, whereupon the filter will be covered with an insoluble mass, which is abandoned, the filtrate being retained, as this contains the active principle which is known as helicidine.

This liquid is hereafter submitted to a eugenesic temperature during 20 to 30 hours, whereupon the temperature is raised to 45 or 65° during half an hour.

Said liquid may be used in dilutions prior to its titration, or by submitting same to a desiccation process until obtaining a new powder.

The aforementioned process which has been described by way of an illustrative example, will admit numerous changes without departing from the essence of the invention. Thus, for instance, instead of exciting the molluscas for the secretion of their juices, it will also be practical to crush the entire bodies, treat them with lukewarm water, filter this and thereafter submit this filtrate to the other operations. Furthermore, either of the two processes may be carried out under shelter from the air, in a neutral atmosphere, thereby preventing oxidations. Instead of penicillin, any other antibiotic giving the same result, may be used.

Although in the foregoing description special reference has been made to the helicides, this invention also comprises the secretions similar to those of any of the animals included in the mollusca type.

The constitutive property of the chemical formula of the so-called helicidine, has not yet been determined, however there is not the slightest doubt in that it relates to an albuminoid pertaining to the group of the gluco-proteids. Whatever this formula may be, it will relate to a chemical species, a complex or mixture of divers substances which by no means will affect the essence of the invention.

Having now particularly described and ascertained the nature of my said invention and in what manner the same is to be performed, I declare that what I claim is:

1. A process for the production of helicidine, an antibiotic specific for *Haemophilus pertussis* comprising the steps of exciting living molluscs of the helicides type suspended in water to obtain secretions therefrom, separating the secretions from the molluscs, stirring the aqueous secretions until a creamy consistency is obtained, maintaining the pH of the secretions at neutrality, drying the secretions in a thin layer on a glass support to form a compact cohesive powder in the lower layer and a light scaly powder in the upper layer, blowing off the upper layer of scaly powder, grinding the remaining cohesive powder, dissolving the powder in physiological serum in the proportion of 1 to 10%, aging the solution so obtained at 0–10° C. for 60–75 hours, and aseptically filtering the solution to obtain a filtrate containing as its active antibiotic agent, helicidine.

2. A method as in claim 1 wherein the excitation of the molluscs to promote their secretion is carried out by mechanically jabbing the molluscs.

3. A method as in claim 1 wherein the excitation to promote the secretion of the molluscs is carried out chemically by immersing the molluscs in a salt solution.

4. A method as in claim 1 wherein the excitation to promote the secretion of the molluscs is carried out chemically, by immersing the molluscs in a weak acid solution.

5. A method as in claim 1 wherein the final aseptic filtrate is desiccated to form powdered helicidine.

6. A method as in claim 1 wherein prior to the drying of the aqueous secretion of the molluscs, the secretions are treated with an organic solvent taken from the class consisting of chloroform and chloroform-ether mixtures.

7. A process for the production of helicidine, an antibiotic specific for *Haemophilus pertussis* comprising the steps of exciting living molluscs of the helicides type suspended in water to obtain secretions therefrom, separating the secretions from the molluscs, stirring the aqueous secretions until a creamy consistency is obtained, maintaining the pH of the secretions at neutrality, drying the secretions in a thin layer on a support to form a compact cohesive powder in the lower layer and a light scaly powder in the upper layer, blowing off the upper layer of scaly powder, dissolving the powder in physiological serum in the proportion of 1 to 10%, aging the solution so obtained at 0–10° C. for 60–75 hours, and aseptically filtering the solution to obtain a filtrate containing as its active antibiotic agent, helicidine.

References Cited in the file of this patent

Julien in Chem. Abstracts, vol. 34, 1940, page 3373.

Takahashi in Chem. Abstracts, vol. 10, 1916, page 1382.

Bailey on Antibiotics in "Annual Review of Microbiology," 1948, vol. II, page 148.

Hotchkiss in J. Biol. Chem., Oct. 1941, 141, pages 155–162.

Pavan, La Ricerca Scientifica, Anno 19, No. 9, Sept. 1949, pages 1011–1017.

Ritter, Ill. Med. J., Oct. 1938, pages 369, 373.

Brandly, Am. J. Vet. Research, July 1946, page 295.

Cecil, Textbook of Medicine, Seventh ed. 1948, W. B. Saunders, Phila., pages 260–261.